United States Patent [19]

Usuki et al.

[11] Patent Number: 4,555,735

[45] Date of Patent: Nov. 26, 1985

[54] INTERCONNECTION SYSTEM BETWEEN IMAGE PICKUP DEVICE AND RECORDING DEVICE

[75] Inventors: Hiroshi Usuki; Hiroshi Taniguchi, both of Osaka, Japan

[73] Assignee: Matsushita Electric Industrial Co., Ltd., Osaka, Japan

[21] Appl. No.: 538,834

[22] Filed: Oct. 4, 1983

Related U.S. Application Data

[63] Continuation of Ser. No. 206,082, Nov. 12, 1980, abandoned.

[30] Foreign Application Priority Data

| Nov. 19, 1979 | [JP] | Japan | 54-160906 |
| Dec. 12, 1979 | [JP] | Japan | 54-161773 |
| Apr. 30, 1980 | [JP] | Japan | 55-57357 |

[51] Int. Cl.$^4$ .......................................... H04N 9/491
[52] U.S. Cl. .................................. 358/330; 358/906; 358/41; 358/310
[58] Field of Search ............... 358/1, 12, 14, 15, 21 R, 358/23, 41, 43, 47–50, 327–330, 906, 17, 148, 149, 310; 360/19, 20, 30, 31

[56] References Cited

U.S. PATENT DOCUMENTS

| 3,700,793 | 10/1972 | Borsuk et al. | 358/15 X |
| 3,827,074 | 7/1974 | De Thieulley et al. | 358/15 |
| 3,916,436 | 10/1975 | Marey et al. | 358/1 |
| 3,918,085 | 11/1975 | Numakura et al. | 358/4 |
| 3,982,272 | 9/1976 | Venhouven et al. | 358/14 X |
| 4,079,412 | 3/1978 | Kosaka | 358/328 |
| 4,134,126 | 1/1979 | Hirai | 358/330 |
| 4,177,481 | 12/1979 | Yamagiwa et al. | 358/8 |
| 4,188,638 | 2/1980 | de Haan | 358/15 X |
| 4,208,673 | 6/1980 | Numakura | 358/328 X |

FOREIGN PATENT DOCUMENTS

1495784 12/1977 United Kingdom .

OTHER PUBLICATIONS

P. 1 of U.K. 2066613.
NEC:MNC-80A Series Handy TV Cameras for Multi-Applications, Ikeda et al., JEE Japan, Feb. 1980, pp. 69–71.
"Model CK-38, A New Color Camera for Electronic News Coverage", Miyari et al., Toshiba Review No. 103, pp. 21–26, May/Jun. 1976.
"A Digitally Controlled Color Television Camera", Cuomo, Journal of the SMPTE, vol. 19, No. 11, Nov. 1970, pp. 1003–1008.
"The Digital Control of a Color Camera and its System Implications", Schat, The SERT Journal, vol. 8, No. 4, pp. 75–77, Apr. 1974.
"A 22 lb, 1/4 in. Portable Color Video Camera/Recorder System", Rody, Journal of the SMPTE, vol. 84, No. 8, pp. 607–609, Aug. 1975.
"Electronic News-Gathering System, Sugimoto et al., IEEE Transactions on Broadcasting, vol. BC21, No. 1, pp. 15–24, Mar. 1975.

*Primary Examiner*—Aristotelis M. Psitos
*Attorney, Agent, or Firm*—Burgess, Ryan & Wayne

[57] ABSTRACT

A system for interconnecting with a single coaxial cable between an image pickup device such as a color television camera and a recording device such as a video tape recorder is provided. The camera signal is separated into the luminance signal which in turn is frequency modulated and two color signals which in turn are converted at a low frequency band lower than the lower sideband of the FM luminance signal. The FM luminance signal and the modulated color signal are multiplexed with the audio signal at the base band and transmitted on a single coaxial cable to the recording device. In the case of the high-density recording without the guard bands between the adjacent tracks, there is provided a means for maintaining the one-to-one correspondence between the rotating recording head and the processing of the modulated color signal which is varied for each track.

2 Claims, 21 Drawing Figures

INTERCONNECTION SYSTEM BETWEEN IMAGE PICKUP DEVICE AND RECORDING DEVICE

This application is a continuation of application Ser. No. 206,082 filed Nov. 12, 1980, now abandoned.

BACKGROUND OF THE INVENTION

The present invention relates to an interconnection system between an image pickup device such as a color television camera and a recording device such as a video tape recorder.

A color television camera and a video tape recorder are interconnected with a suitable cable so that the video, audio and operation control signal may be transmitted from the camera to the recorder and the reproduced video signal may be transmitted from the recorder to the camera so that one can review the reproduced images on an electronic viewfinder.

So far the multicore cables have been used in interconnecting the cameras and the recorders. The use of such cables has some problems to be described below. First since the cable is very heavy, operability is poor; that is, handling of the television camera is inconvenient. Secondly, the multicore cables are in general large in diameter so that a large space is needed for storage and it is inconvenient to store or take out a cable. Thirdly, special connectors and special multicore cables must be used because of the transmission of various signals such as the video, audio and operation control signals. As a result, they are expensive.

In order to overcome the above-described problems, the use of wireless transmission of signals between a television camera and a video tape recorder might be considered so that the interconnection cables could be eliminated. However, because of the communications laws, only a very weak output is obtained so that S/N ratio is low. In addition, the image quality would be degraded by external interference. As a result, the wireless transmission could be used in practice only under specially favourable conditions. Thus, as a countermeasure, the use of only one signal line is considered. To this end, the standard television modulation of the audio and video signals may be proposed. However, a RF converter must be mounted on a television camera while a tuner, an intermediate frequency (IF) circuit, a video demodulator, an audio demodulator and so on must be added to a video tape recorder so that the interconnection system would become very complex in construction and very expensive.

SUMMARY OF THE INVENTION

One of the objects of the present invention is to provide an interconnection system between a color television camera and a video tape recorder in which the video signal which is processed in a video tape recorder in the conventional interconnection systems is processed in the camera so that the video, audio and operation mode control signals are multiplexed and transmitted on a single signal line to the recorder without the use of any additional circuit such as a RF converter, a tuner, an IF circuit, a video demodulator, an audio demodulator and so on in addition to the components of the conventional television-video tape recorder systems, whereby the interconnection system can be made very simple in construction.

According to the present invention, an image pickup device or a color television camera includes a means for angular modulating the luminance signal in the camera signal, a means for converting two color signals in the camera signal to a modulated color signal the frequency band of which is lower than the lower sideband of the angular-modulated luminance signal, a means for deriving from a microphone associated with the television camera or the like the audio signal at the base band lower than the band of the modulated color signal and a means for multiplexing these angular modulated luminance signal, modulated color signal and audio signal so that the multiplexed signal can be transmitted on a single signal line to a video tape recorder. The video tape recorder includes a means for recording the angular modulated luminance signal and the modulated color signal without any modification of their spectra and a means for recording the audio signal through an audio signal recording circuitry. Thus, the interconnection between the television camera and the video tape recorder can be much simplified.

Furthermore, according to the present invention, an operation mode control signal can be also transmitted on the same signal line from the camera to the recorder.

According to the present invention, the television camera or the like and the video tape recorder can be interconnected with a single signal line. As a result, the multicore cables used in the conventional interconnection systems can be eliminated. Thus, excellent operability can be ensured and the cost can be dramatically reduced.

DESCRIPTION OF THE PREFERRED EMBODIMENTS

Figure 1:
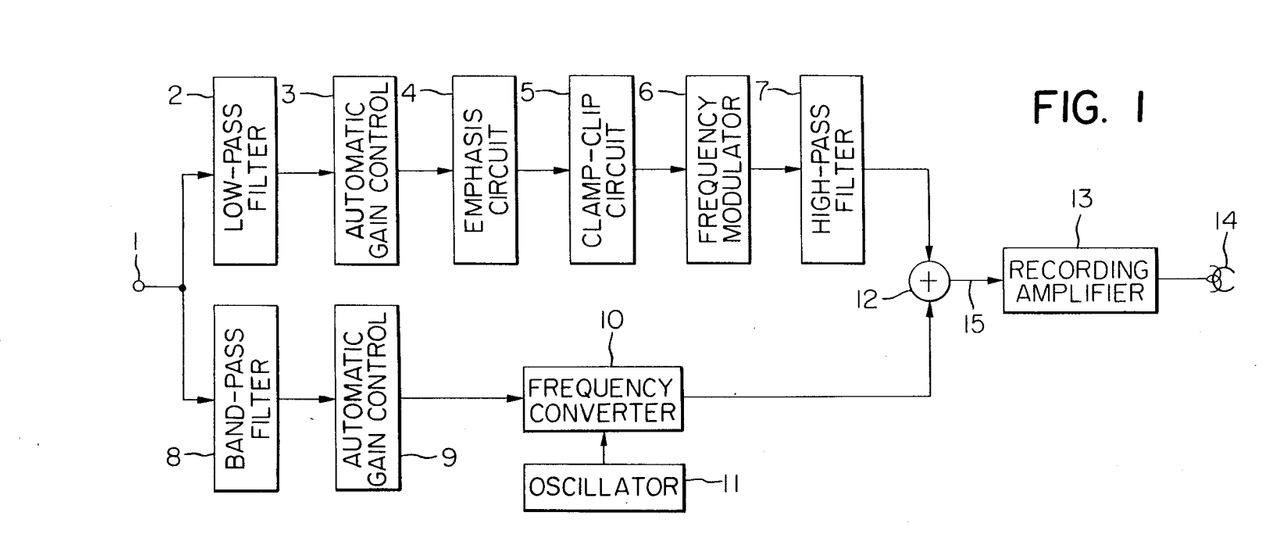
FIG. 1 is a block diagram of a recording signal processing section in a video tape recorder used for the explanation of the underlying principle of the present invention.
Figure 2:
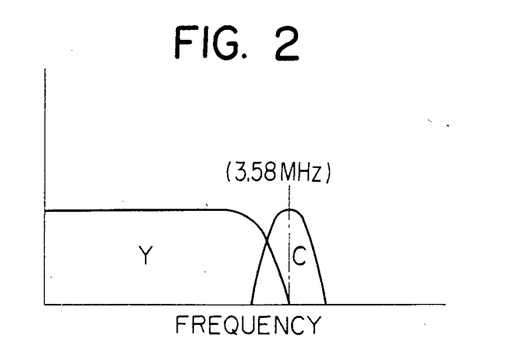
FIG. 2 shows the frequency spectrum of the video signal in a conventional television channel.
Figure 3:
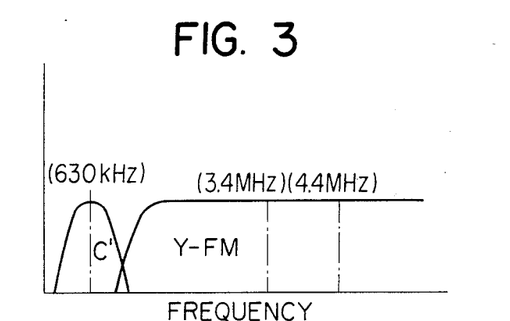
FIG. 3 shows the frequency spectrum of the video signal processed in the recording signal processing section shown in FIG. 1.

Underlying Principle, FIGS. 1 through 3

FIG. 1 shows in block diagram a signal processing circuit of a recording system of a conventional video tape recorder. The camera signal from a television camera which is applied to an input terminal 1 has a frequency spectrum as shown in FIG. 2. The recording system is divided into a luminance channel and a color or chrominance channel. In the luminance channel, only the luminance signal passes through a low-pass filter 2 and its level is controlled to a predetermined level by an automatic gain control 3. Thereafter, the luminance signal passes through an emphasis circuit 4 and a clamp-clip circuit 5 to a frequency modulator 6. The frequency-modulated or FM luminance signal passes through a high-pass filter 7 so that its lower sideband is attenuated. Finally, the FM luminance signal is applied to a mixer 12.

In the color or chrominance channel, after only the color signals pass through a band-pass filter 8, are adjusted in level by an automatic color gain control 9 and applied to a frequency converter 10 which in turn coacts with an oscillator 11 so as to convert the color carrier frequency to a low frequency (for instance, 629.370 KHz in the VHS system). The frequency converted color signals are applied to the mixer 12 and mixed with the frequency-modulated luminance signal. The mixed or combined signals are applied through a recording amplifier 13 to a video head 14.

As shown in FIG. 3, the output signal 15 from the mixer 12 has only the FM luminance signal and the color signal converted to a low frequency of 630 KHz (in the VHS system) so that the output signal has only the frequency components above about 100 KHz. In other words, there exists no signal at from DC to 100 KHz. Therefore, it is possible to superpose the audio signal at 40 to 20000 Hz and the DC on-off control signal.

In summary, if the signal processing circuit of the recording system of the video tape recorder is placed in the television camera so that the video signal is converted within the camera into the signal having the frequency spectrum as shown in FIG. 3, the converted video signal can be transmitted on the signal line of the connection cable so that the video signal is superposed with the audio signal and the control signal and transmitted over the same signal line.

Figure 4:
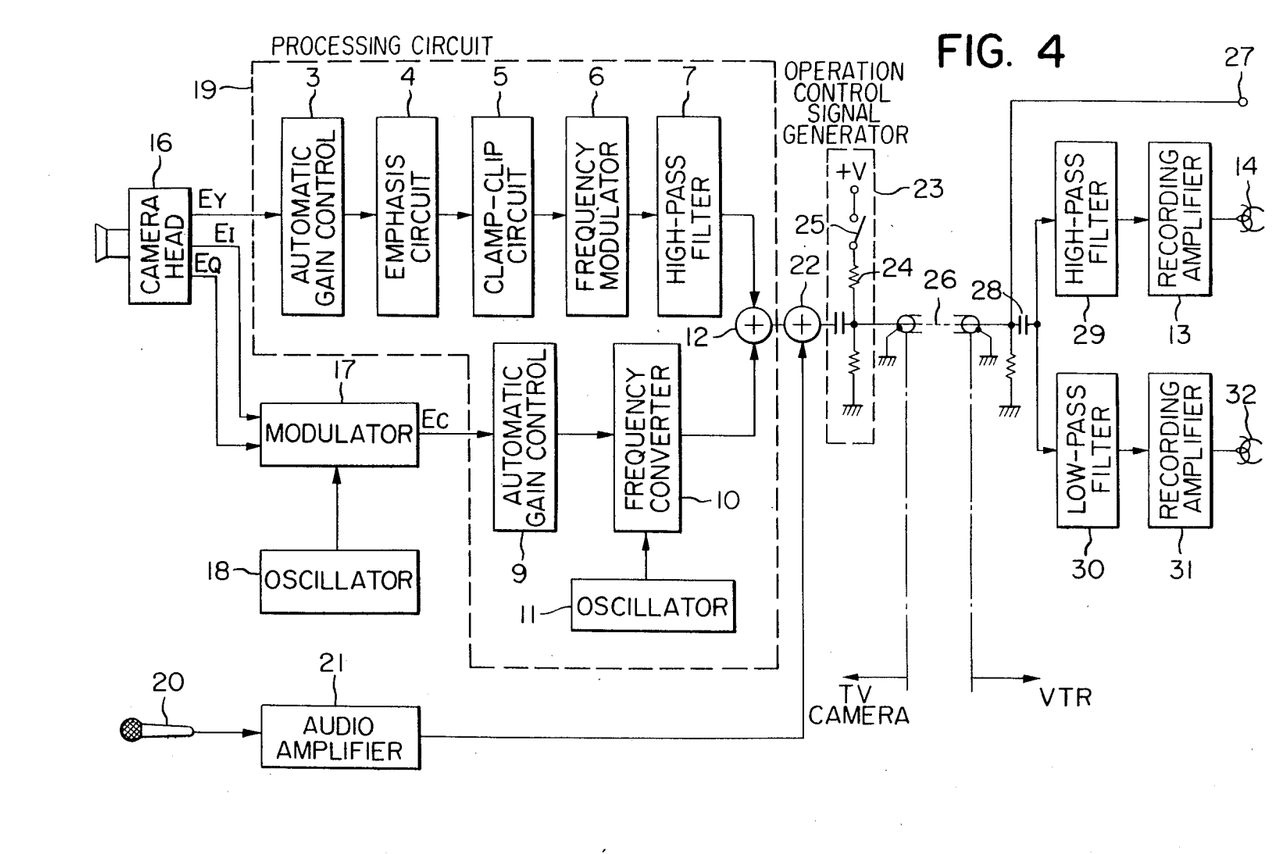
FIG. 4 is a block diagram of a first embodiment of the present invention.
Figure 5:
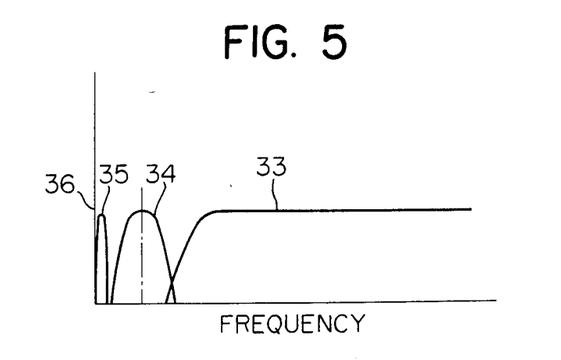
FIG. 5 shows the frequency spectrum of the multiplexed signal transmitted on a signal line shown in FIG. 4.
Figure 6:
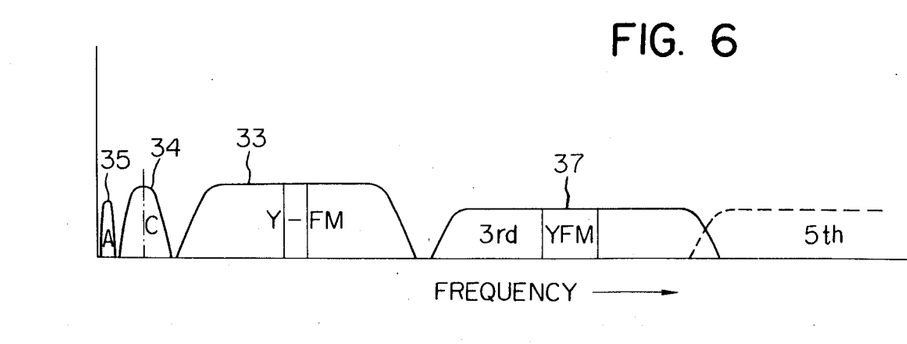
FIG. 6 shows another example of the frequency spectrum of the multiplexed signal transmitted on the signal line.

First Embodiment, FIGS. 4 through 6

Referring to FIG. 4, a camera head 16 delivers the luminance signal Ey added with the sync signal and two color signals $E_I$ and $E_Q$. The signals $E_I$ and $E_Q$ are applied to a modulator 17 which receives the sub-carrier from a sub-carrier generator 18 and modulates the color signals $E_I$ and $E_Q$ into quadrature two-phase modulated signals. The modulated color signals are applied to a recording signal processing circuit 19 to which is also applied the luminance signal Ey.

In the processing circuit 19, the luminance signal passes through the automatic gain control 3, the emphasis circuit 4, the clamp-clip circuit 5 and the frequency modulation circuit 6 so that the luminance signal Ey is frequency modulated as described previously with reference to FIG. 1. The FM luminance signal passes through the high-pass filter 7 so that the lower sideband is attenuated. The modulated color signal passes through the automatic color gain control circuit 9 and the frequency converter 10 so that they are modulated to the signals of low frequencies as described previously. The frequency modulated luminance and color signals are applied to the mixer 12 and mixed with each other. As described previously, the frequency converter 10 and the oscillator 11 coact to convert the color signals to the signals at low frequencies, but it is to be understood that if used a low frequency sub-carrier generator as the oscillator 18 instead of the standard frequency sub-carrier generator so that the sub-carrier can be subjected to the two-phase modulation so as to be directly converted to have low frequencies (for instance, 629.370 KHz in the VHS system), the frequency converter 10 can be eliminated. In addition, when a camera head 16 has an automatic gain control means, the automatic gain control circuits 3 and 9 can be eliminated.

The audio signal is derived from a microphone 20, amplified by an audio amplifier 21 and mixed with the modulated video signal in a mixer 22.

The operation control signal is represented by whether the DC bias signal transmitted to the video tape recorder is at a high level or at a low level. For instance, when the DC bias rises to a high level, the video tape recorder is activated, but when it drops to a low level, the recorder is stopped. To this end, in an operation control signal generator 23, a terminal 25 is connected to a DC power source and the DC bias rises to a high level or drops to a low level when a switch 24 is closed or opened.

The camera signal consisting of the superposed video, audio and control signals has a frequency spectrum as shown in FIG. 5 and can be transmitted on a single signal line 26 to the video tape recorder. In FIG. 5, 33 denotes the frequency modulated luminance signal; 34, the low-frequency color signals; 35, the audio signal; and 36, the operation control signal; that is, DC bias.

Referring back to FIG. 4, in the video tape recorder, whether the transmitted DC bias is at a high or low level is detected at an operation control signal output terminal 27 so that the video tape recorder is activated or stopped. The DC bias signal is blocked by a blocking capacitor 28 and the video and audio signals are channeled to the video and audio channels, respectively. In the video channel, only the video signal passes through a high-pass filter 29 and a recording amplifier 13 and is applied to a video head 14. In the audio channel, only the audio signal passes through a low-pass filter 30 and a recording amplifier 31 and is applied to an audio head 32.

As described above, according to the first embodiment, in order to transmit the camera signal on a single signal line from the television camera to the video tape recorder, the frequency division multiplexing system is used in such a way that the luminance signal is frequency-modulated, the color signals are converted to the low-frequency modulated color signals, the audio signal is the baseband signal and the operation control signal is at the DC level. At the video tape recorder, the video and audio signals are separated and the video signal as received can be directly recorded. The audio signal is processed and then recorded. Thus, the efficient signal processing can be attained and the camera signal consisting of four signals can be transmitted on a single line.

So far the first embodiment has been described in conjunction with the NTSC or PAL system, but in the case of the SECAM system, the color signal processing circuit must be modified. In the SECAM system, two line-sequential color difference signals R-Y and B-Y are frequency modulated. Therefore, in order to convert the modulated color signals into the signals at low frequencies, the frequencies must be stepped down with frequency dividers or the like. Alternatively, the frequency modulation may be made directly at a low frequency band.

So far the television camera and the video tape recorder have been described as having built-in power sources, respectively, so that they are powered independently of each other. However, there has been proposed a system in which in order to make a television camera compact in size and light in weight, the camera has no built-in power supply but is supplied with the power from the video tape recorder. According to the present invention, the camera and the video tape recorder are interconnected with a single signal line so that it may be possible to supply the power by using this single signal line. In this case, the power supply must have such an output impedance that exhibits a high impedance against AC component but a low impedance to the DC component, for example, a high impedance. In addition, instead of the two-level DC operation control signal, it must be transmitted in a manner to be described below.

Furthermore, the use of optical fibers may be considered in order to make the signal connection or transmission line between the camera and the video tape recorder reduce its diameter and subsequently become light in weight. However, the transmission of the two-level DC control signal becomes difficult. The reason is that when the optical fibers are used, DC bias must be added to the signal to be transmitted so as to minimize the distortions because of the nonlinearity of the input-output characteristics of light-emitting elements. In general, DC bias of a light-emitting element is so selected that distortions are tolerable with a minimum consumption of power. As a result, from the standpoint of the power consumption as well as distortions, it is not preferable to transmit the DC signal for controlling the recording equipment. In addition, because of the temperature characteristics, the photosensors cannot distinguish in a stable manner between the two-level operation control signal and the DC bias added to the light-emitting elements. Therefore, an alternative of the two-step DC operation control signal will be described below.

Referring again to FIG. 4, the output signal from the frequency modulator 6 is in general of the rectangular shape so that it includes odd-numbered harmonics. As a result, the camera signal transmitted on the signal line 26 has a frequency spectrum as shown in FIG. 6, in which 35 indicates the audio signal at the base band; 34, the modulated color signal with modulation at low frequency; and 33, the FM luminance signal which has third and higher or upper odd-numbered harmonics 37.

These higher harmonics fall in the range which is by far higher than the recording-playback frequency range of the video tape recorder so that no problem arises in practice. However, it is preferable as a principle to suppress them. But these higher-order harmonics can be used as the operation control signal. More specifically, the control signal is represented in the form of the attenuated or unattenuated harmonics as will be described in detail below.

Figure 7:
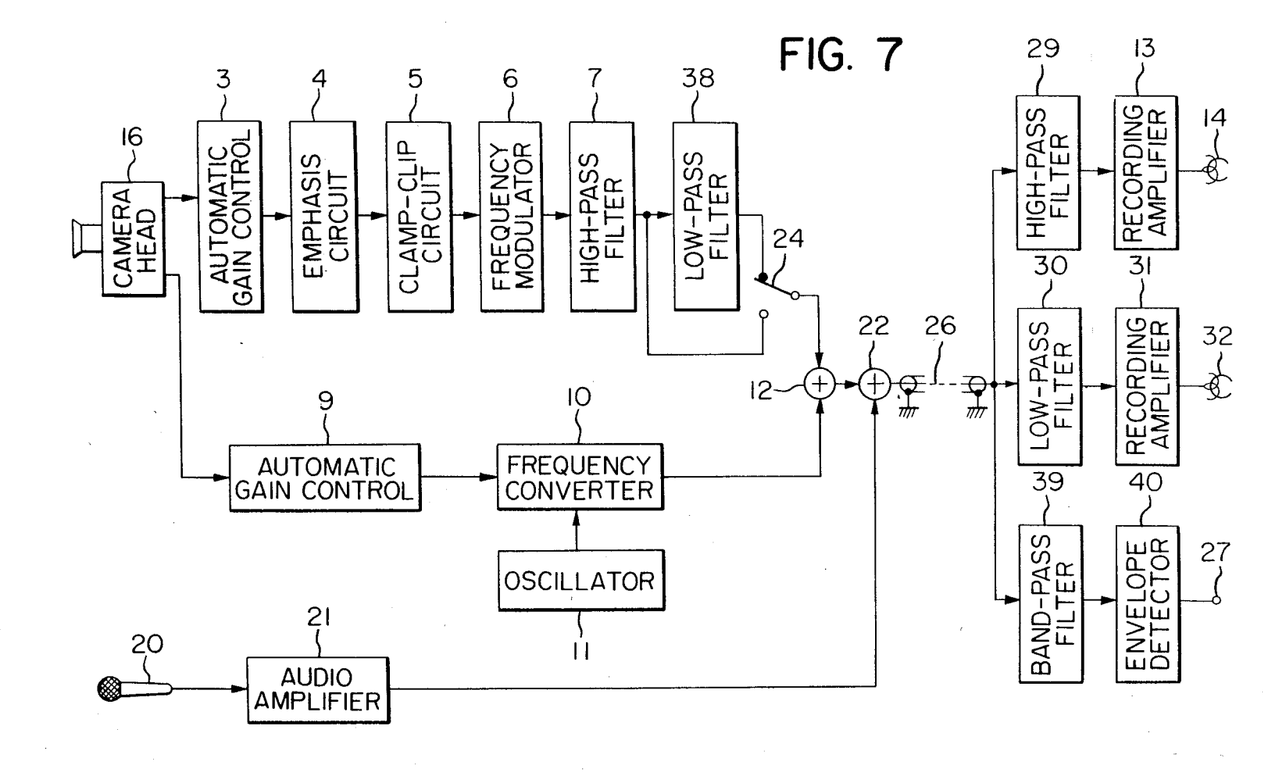
FIG. 7 is a block diagram of a second embodiment of the present invention.

Second Embodiment, FIG. 7

The second embodiment shown in FIG. 7 is substantially similar in construction to the first embodiment shown in FIG. 4 except the addition of the control signal detection channel consisting of a band-pass or low-pass filter, an envelope detector 40 and the output terminal 27 in the video tape recorder and the addition of a low-pass filter 38 and a mode selection switch 24 in the luminance signal channel.

The low-pass or band-pass filter 38 attenuates the harmonics of the output signal from the frequency modulator 6. The selection switch 24 switches so that the FM luminance signal passes through this filter 38 or not. In response to the operation control signal transmitted from the camera, the video tape recorder is switched to the recording mode of the stand-by mode.

The harmonics of the FM luminance signal are attenuated when the signal passes through the filter 38. Therefore, when the movable arm of the switch 24 closes the black dot contact, the video tape recorder is in the recording mode, but when the arm closes a white dot contact so that the FM luminance signal bypasses the filter 38, the recorder is in the stand-by mode, and vice versa.

At the video tape recorder, the band-pass filter 39 passes only a predetermined harmonic, for example, the third harmonic of the FM luminance signal which is detected with the envelope detector 40. The output; that is, the control signal is derived from the output terminal 27 and controls the stand-by circuit in the video tape recorder.

As described above, the stand-by circuit in the video tape recorder is controlled depending upon whether the FM luminance signal has the harmonics or not. This means that without providing any special circuit, the operation control signal can be transmitted from the camera to the video tape recorder.

So far the video tape recorder has been described as being switched between the recording mode and the stand-by mode in response to the control signal from the camera. However, as described previously, the FM luminance signal includes the odd-numbered harmonics such as the third, 5-th, 7-th and so on. Therefore, suitable band-pass filters may be built in the camera so that these harmonics, attenuated or unattenuated, may be selectively transmitted to the video tape recorder which in turn detects the transmitted harmonics with the band-pass filters so that in addition to the recording and stand-by mode signals, other mode signals such as the reproduction mode signal, the rewinding mode signal and so on can be used. In addition, it may be possible to use these signals to control other control circuits other than the above-described mode selection circuit.

Figure 8:
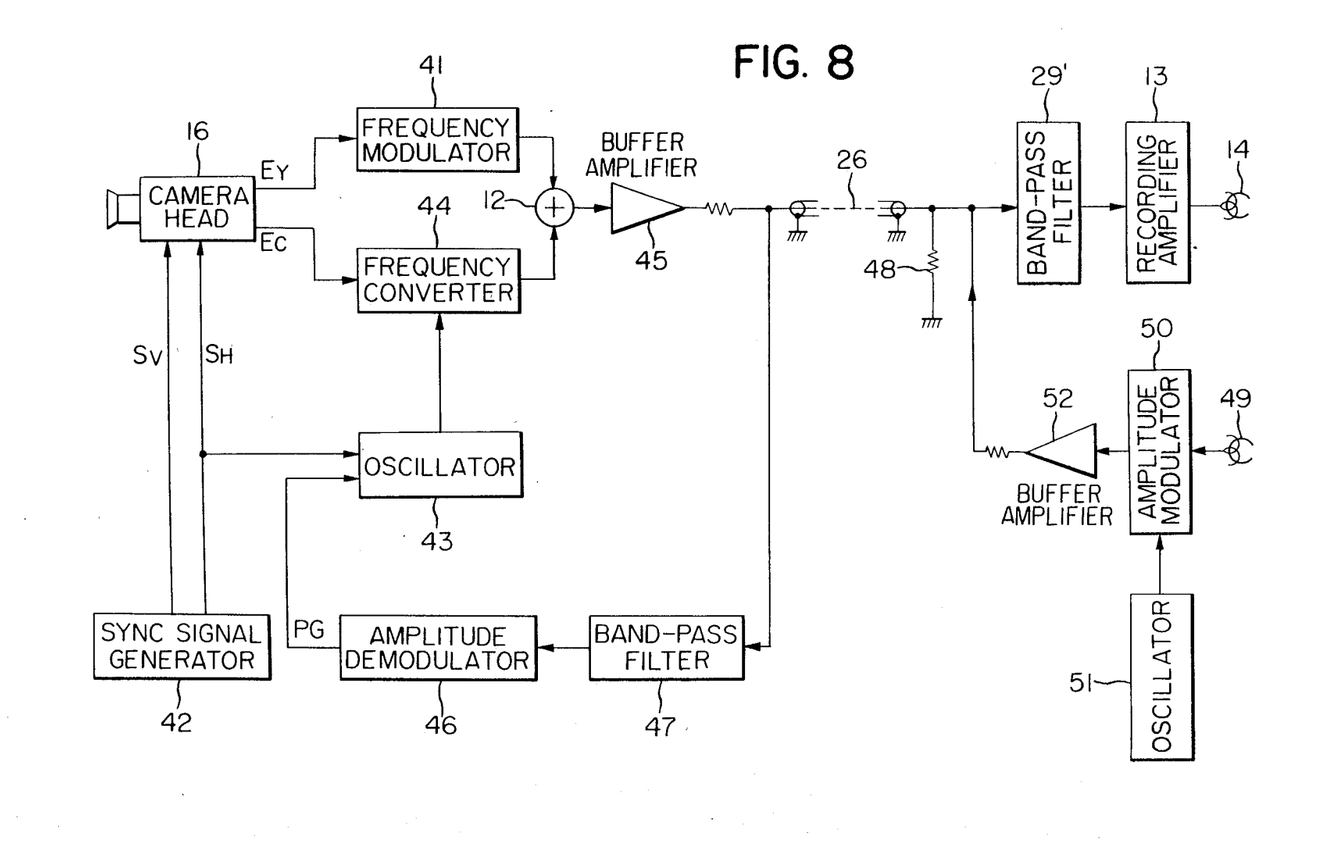
FIG. 8 is a block diagram of a third embodiment of the present invention applied to a high-density recording video tape recorder.

Third Embodiment, FIG. 8

Next will be described the system for connecting the camera with the video tape recorder of the type in which, as in the case of the high-density VHS system, employs the system for eliminating cross-talk of color signal between the adjacent tracks.

In order to increase the recording density on the recording tape or medium of the video tape recorders, there has been devised and demonstrated the azimuth recording system in which heads with different gap angles are used so as to eliminate the guard bands of the video tracks. The azimuth recording system cannot attain the satisfactory azimuth effects at low frequencies so that in order to eliminate cross-talk of the FM color signal with modulation at low frequencies, the line correlation of the FM color signal has been used. This is called the PS color system in the case of the VHS system. The PS color system is described, e.g., in U.S. Pat. No. 4,079,412. In this system, on the main or A tracks, the FM modulated color signal is advanced by 90° in phase in each horizontal scanning time interval while on the adjacent or B tracks, the FM color signal is lagged behind by 90° in phase in each horizontal time interval. In the reproduction, the color signals recorded on the A and B tracks are lagged behind and advanced, respectively, by 90° in phase so that the phase of the color signal prior to the recording may be restored. Thereafter, cross-talk components are removed with the comb-filter. In order to determine whether the FM signal being recorded is advanced or lagged behind in phase at a given time point; that is, whether the color signal is being recorded on the A or B track, the PG pulse (at 30 Hz; a rectangular waveform) derived from the head rotary phase detecting signal is in general used. When the PG pulse is at a high level, the modulated color signal is advanced in phase, but when the head switching pulse is at a low level, the modulated color signal is lagged behind in phase. In like manner, whether the modulated color signal has been advanced or lagged behind in phase and recorded the shifted phase of reproduced color signal can be detected with the PG pulse in the case of the reproduction.

When the PS color system is employed in the system in which instead of processing the signals in the video tape recorder, the video, audio and control signals are processed and multiplexed in the camera and then transmitted on a single signal line to the video tape recorder, the head switching pulse representative of the rotary pulse of the rotary cylinder must be transmitted through a suitable means from the camera to the video tape recorder in the recording mode. However, as described previously, the video signal in the frequency band of from 100 KHz to 5 MHz, the audio signal of from 40 Hz to 20 KHz and the DC operation control signal are multiplexed and transmitted on the single line so that the rectangular PG pulse of 30 Hz cannot be transmitted on the same line.

However, it is possible to transmit the PG pulse on the same single signal line if it is amplitude or frequency modulated at the frequency band (for instance between 20 KHz and 100 KHz or over 5 MHz) which is not used in transmission on the single signal line. (It is assumed in this case that DC operation control signal be on the same line.)

This transmission system may be realized with the system shown in FIG. 8. The luminance signal Ey added with the sync signal and the modulated color signal Ec are derived from the camera head 16. The luminance signal Ey is frequency modulated in a frequency modulator 41 while the modulated color signal Ec is applied to the frequency converter 44 so that it is converted into the signal at low frequencies. In order to accomplish the PS color processing, the color carrier must be shifted by 90° for each horizontal scanning time interval. To this end, an oscillator 43 receives the horizontal sync signal $S_H$ from the sync signal generator 42 so that the output from the oscillator 43 is shifted by 90° for every horizontal scanning time interval. At the same time, the oscillator 43 receives the demodulated PG pulse from an amplitude demodulator 46 so that the output from the oscillator 43 is advanced and lagged behind by 90° in phase alternately for each horizontal scanning time interval. In response to the output from the oscillator 43, the frequency converter 44 converts the modulated color signal to lower frequencies. Thus, the PS color system is realized.

The modulated color signal with conversion at lower frequencies is combined with the FM luminance signal in the mixer 12 and the combined signal is applied to a buffer amplifier 45. After the impedance having been changed, the combined signal is transmitted on the signal line 26.

The PG pulse derived from a rotary phase detection head 49 is applied to an amplitude modulator 50 and amplitude modulates the carrier of the order of 10 MHz from an oscillator 51. After passing through a buffer amplifier 52, the amplitude modulated PG pulse is transmitted on the signal line 26.

The combined signal and the AM PG pulse flow into the resistor 48 so that the voltage drop thereacross becomes the product of the value of this resistor and the sum of the combined signal current and the AM PG pulse current. As a consequence, the combined signal consisting of the video signal and the AM PG pulse flows through the signal line 26. The AM PG pulse is separated by a band-pass filter 47 and applied to the amplitude modulator 46. The video signal is separated with the band-pass filter 29' and applied to the video head 14 through the recording amplifier 13.

As described above, the PG pulse is amplitude modulated at the frequency of the order of 10 MHz so that the AM PG pulse can be combined with the video signal and transmitted on the single line.

Instead of the frequency band of the order of 10 MHz, a higher frequency band or the band between 50 KHz and 100 KHz; that is, between the video and audio signal ranges can be used.

Figure 9:
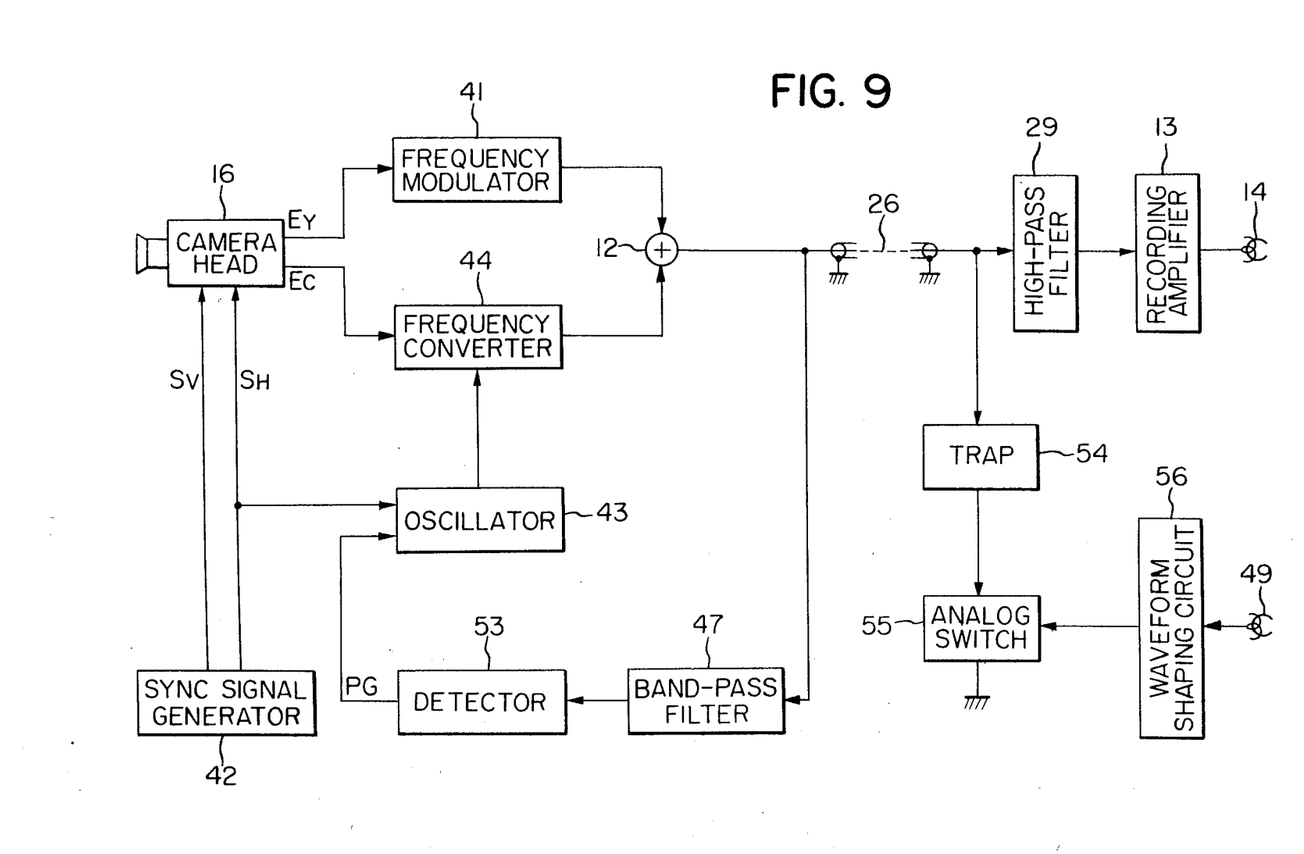
FIG. 9 is a fourth embodiment of the present invention which is a modification of the third embodiment shown in FIG. 8.

Fourth Embodiment, FIG. 9

As described above, the third embodiment needs the modulator 50 and the demodulator 46. In the fourth embodiment to be described in detail with reference to FIG. 9, the PG pulse is transmitted in terms of the upper harmonics of the FM luminance signal as with the transmission of the control signals.

Referring to FIG. 9, a trap 54, which utilizes the resonance circuit consisting of an inductance and a capacitor connected in series, attenuates the upper harmonics of the FM luminance signal and is coupled to an analog switch 55 which is turned on or off in response to the PG pulse derived from the rotary phase detection head 49 through a waveform shaping circuit 56. The FM luminance signal derived from the frequency modulator 41 is transmitted on the signal line 26 and its upper harmonics are attenuated by the coaction of the trap 54 and the analog switch 55 depending upon whether the PG pulse is at a high or low level. At the television camera, whether the upper harmonics of the FM luminance signal are attenuated or not is detected with the band-pass filter 47 and a detector 53. The output from the detector 53 is transmitted as the PG pulse to the oscillator 43 which in turn shifts the phase of its output in the manner described in conjunction with the third embodiment with reference to FIG. 8.

When the upper harmonics of the FM luminance signal are utilized in the manner described above, the PG pulse can be transmitted in a very simplified yet effective manner.

Figures 10, 10A:
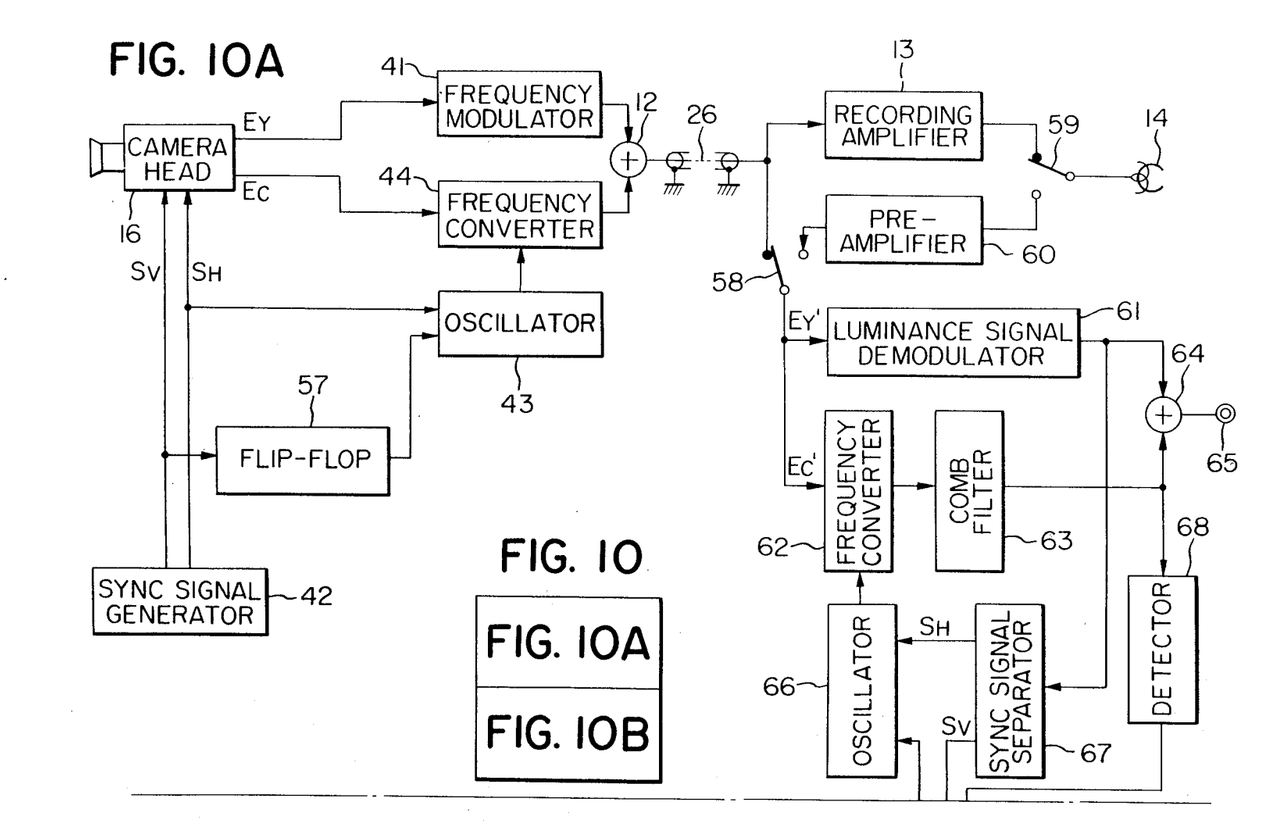
FIG. 10, consisting of 10A and 10B, is a block diagram of a fifth embodiment of the present invention which is also another modification of the third embodiment shown in FIG. 8.
Figure 10B:
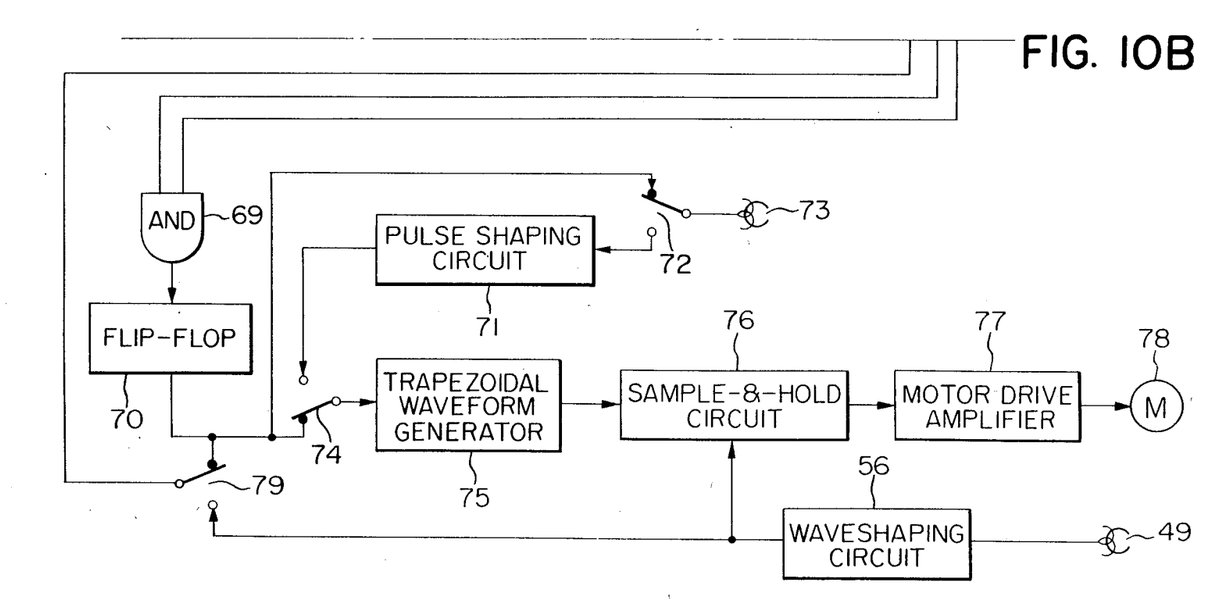
Figure 11:
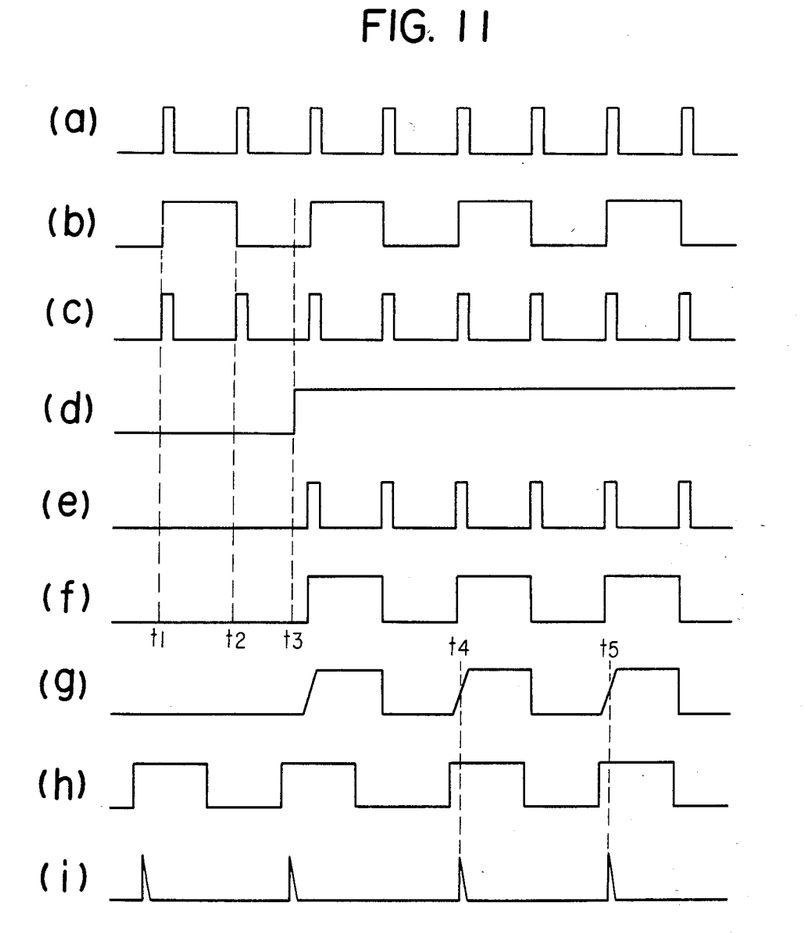
FIG. 11, consisting of (a)–(i), shows the waveforms used for the explanation of the mode of operation of the fifth embodiment.

Fifth Embodiment, FIGS. 10 and 11

In the third and fourth embodiments, the PG pulse is transmitted from the video tape recorder to the television camera, but the fifth embodiment can attain the correspondence between the phase reversal of the modulated color signal and the head rotation phase without the transmission of the PG pulse.

Referring to FIG. 10, switches 58, 59, 72, 74 and 79 are simultaneously switched when the video tape recorder is switched from the recording mode to the reproduction mode or from the reproduction mode to the recording mode. When their movable arms are in contact with black dots contacts, as shown in FIG. 10, the video tape recorder is in the recording mode.

The luminance signal Ey added with the sync signal and the modulated color signal Ec are derived from the camera head 16. The luminance signal Ey is applied to the frequency modulator 41 so that the frequency modulated (FM) luminance signal is derived. The modulated color signal is applied to the frequency converter 44 so that the modulated color signal is converted to the signal at low frequencies.

In order to accomplish the PS color processing, the phase of the color carrier must be shifted by 90° for each horizontal scanning time interval. The oscillator 43 receives the horizontal sync signal $S_H$ from the sync signal generator 42 so that the output from the oscillator 43 is shifted by 90° for every one HT (horizontal scanning time). The oscillator 43 also receives the vertical sync signal Sv (See FIG. 11a) from the sync signal generator 42 through a flip-flop 57, which forms a rectangular waveshape at 30 Hz (See FIG. 11b), so that the phase of the output from the oscillator 43 is reversed for each vertical scanning time interval. More specifically, when the output from the flip-flop 57 is at a high-level, the output from the oscillator 43 is advanced in phase while the output is at a low level, the output is lagged behind or delayed. Thus, the output from the oscillator 43 is advanced and delayed in phase by 90° alternately for every one HT and is reversed in phase for every one VT (vertical scanning time). In response to the output from the oscillator 43, the frequency converter 44 converts the modulated color signal to that at low frequencies. Thus, the PS color system is realized.

The modulated color signal with conversion at low frequencies is combined with the FM luminance signal in the mixer 12 and transmitted on the signal line 26 to the video tape recorder.

The combined signal goes to the video head 14 through the recording amplifier 13 and to a reproduction section through the switch 58.

In the reproduction section, the FM luminance signal Ey' is demodulated with a luminance signal demodulator 61 and the demodulated luminance signal is applied to a mixer 64 and a sync or burst signal separator 67. The modulated color signal Ec' with conversion at low frequencies is frequency converted to the standard carrier frequency at a frequency converter 62 and the recovered demodulated color signal is applied through a comb filter 63 to the mixer 64 and a detector 68. The output, that is, the combined luminance signal and modulated color signal from the mixer 64 is derived as the video signal at the output 65.

As described previously, the modulated color signal has been frequency converted according to the PS color system and applied to the frequency converter 62 so that the original modulated color signal cannot be recovered unless the frequency conversion is carried out in the video tape recorder in the exact reversed order to that in the television camera. In other words, the output from an oscillator 66 which is applied to the frequency converter 62 must be an exact replica of the output from the oscillator 43 in the camera. Therefore, in response to the horizontal sync signal $S_H$ from the sync signal separator 67, the output from the oscillator 66 is shifted in phase by 90° for every one HT. In like manner, in response to the vertical sync signal Sv (See FIG. 11c) from the sync signal separator 67 through a flip-flop 70, which forms a rectangular waveform at 30 Hz as the flip-flop 57 in the camera, the output from the oscillator 66 is reversed in phase for every one VT.

The vertical sync signal Sv (See FIG. 11a) derived from the sync signal generator 42 in the camera is exactly synchronized in phase with that (See FIG. 11c) derived from the sync signal separator 67 in the video tape recorder, but sometimes output from the flip-flop 57 is not synchronized in phase with that derived from the flip-flop 70 in the recorder. For instance, depending upon the initial condition of the flip-flop 70, they are in phase or out of phase by 180°. It follows, therefore, that the flip-flop 70 must be reset so that the output therefrom may be exactly synchronized in phase with that from the flip-flop 57. If the output from the flip-flop 70 is out of phase by 180° with respect to that from the flip-flop 57, the phase shift of the carrier of the modulated color signal in the camera is opposite to that in the recorder so that the output from the comb filter 63 becomes zero. The detector 68 detects this zero output from the comb filter 63 and causes the flip-flop 70 to reset. The detector 68 is such that it separates only the burst from the output color signal and delivers a high-level output signal when the average level of the burst is higher than a predetermined level during a time interval almost equal to one VT. In other words, the detector 68 delivers the high-level signal when the comb filter 63 delivers the color signal under normal conditions for a time interval almost equal to one VT. The output from the detector 68 is applied to an AND gate 69 which also receives the output Sv from the sync separator 67 and in response to the output from the gate 69, the flip-flop 70 is reset.

Now assume that the output from the flip-flop 70 is at a low level (See FIG. 11f) while the output from the flip-flop 57 is at a high level (See FIG. 11b) at $t_1$. Then the phase shift of the modulated color signal in the camera is opposite to that in the video tape recorder so that, as described previously, the output from the comb filter 63 is zero and consequently the output from the detector 68 (See FIG. 11d) is at a low level. As a result, the output (See FIG. 11e) from the gate 69 remains at a low level so that the flip-flop 70 is not reset; that is, the output remains at a low level (See FIG. 11f). When the state of the flip-flop 57 is reversed so that its output (See FIG. 11b) drops to a low level at $t_2$, the phase shift of the modulated color signal in the camera becomes same as that in the video tape recorder so that the color signal is derived from the comb filter 63. When the output from the comb filter 63 lasts to $t_3$ for a time interval almost equal to one VT, the output (See FIG. 11d) from the detector 68 rises to the high level so that the output from the AND gate 69 rises to the high level. As a result, the flip-flop 70 is set and reset every time when it receives the vertical sync signal Sv (See FIG. 11e) through AND gate 69. Then the output from the flip-flop 70 becomes in phase with that from the flip-flop 57 so that the phase shift of the modulated color signal in the camera becomes same as that in the video tape recorder. As a consequence, the color signal is derived from the comb filter 63 so that the output from the detector remains at the high level (See FIG. 11d). The flip-flop 70 is reset in the manner described above so that the output therefrom is in phase with that from the flip-flop 57. Thereafter, these conditions remain unchanged.

Instead of using the AND gate 69, Q and $\overline{Q}$ outputs of the flip-flop 70 may be so arranged as to be coupled to the oscillator 66 in response to the output from the detector 68. More specifically, the vertical sync Sv is directly applied to the input terminal of the flip-flop 70 and when the output from the detector 68 drops to the low level, a switch is energized to select the Q or $\overline{Q}$ output, which are opposite in phase.

The output from the flip-flop 70 which is in phase with that from the flip-flop 57 is applied as the control signal through the switch 72 to a control head 73 in the servo system. Simultaneously, the output from the flip-flop 70 is applied to a trapezoidal waveform generator 75 so as to be shaped into a trapezoidal waveform as shown in FIG. 11g. The output from the circuit 75 is applied a sample-&-hold circuit 76.

The output from the detection head 49 is applied to a pulse shaping circuit 56 so as to be shaped into a rectangular waveform PG pulse at 30 Hz as shown in FIG. 11h. The sampling pulse (See FIG. 11i) is generated at the leading edge of the PG pulse and applied to the sample-&-hold circuit 76. At t4, the sampling pulse (See FIG. 11i) and the trapezoidal waveform (See FIG. 11g) are locked in phase (prior to t4 they are being depicted as being not locked). The output, that is, an error voltage from the sample-&-hold circuit 76 is amplified with a motor drive amplifier 77 and applied to a cylinder driving motor 78. As described above, the PG pulse (See FIG. 11h) is locked almost in phase with the output (See FIG. 11f) from the flip-flop 70. In practice, the head switching pulse, that is, the output from the flip-flop 70 (See FIG. 11f) is so set as to advance the output (See FIG. 11h) from the waveshaping circuit 56 for five to eight HT. The reason is that if the head switching pulse (See FIG. 11h) is in phase with the output from the flip-flop 70 which is obtained by dividing the frequency of the vertical sync Sv by two, the head switching point would be timed with vertical sync Sv so that in the reproduction mode, the vertical sync Sv is disturbed by a head switch.

The reproduction mode of the video tape recorder is substantially similar to that of the conventional video tape recorders. The movable arms of the switches 58, 59, 72, 74 and 79 are switched to close the white dot contacts. Then the output from the video head 14 is applied through the switch 59 to a pre-amplifier 60 the output of which is applied through the switch 58 to the reproduction section. The FM luminance signal Ey' is demodulated with the luminance signal demodulator 61 while the modulated color signal Ec' with conversion at low frequency is converted at the frequency converter 62 into the standard modulated color signal and applied to the comb filter 63 which eliminates the cross-talk components. The output from the filter 63 is combined with the luminance signal in the mixer 64 and the video signal is derived from the output 65.

In the reproduction mode, the output from the flip-flop 70, which is the rectangular waveshape at 30 Hz obtained by dividing the frequency of the vertical sync Sv by two, may be applied to the oscillator 66 as the signal for determining the direction of the phase shift; that is, the phase reversal of the output of the oscillator 66 which in turn is applied to the frequency converter 62 as described previously. However, in the reproduction mode it cannot be ensured that the vertical sync Sv is positively generated because of the degradation of S/N ratio and dropout. Thus, it is preferable to use the PG pulse by connecting the waveshaping circuit 56 to the oscillator 66 through the switch 79. The flip-flop 57 in the camera and the waveshaping circuit 56 are so reset that their outputs are synchronized in phase in the recording mode, but in practice, the PG pulse advances in phase the output from the flip-flop 57 for five to eight HT. As a result, if the phase reversal of the modulated color signal is made in response to the output from the flip-flop 57 in the recording mode while the phase reversal is made in response to the PG pulse in the reproduction mode, no modulated color signal is derived for five to eight HT during which the output from the flip-flop 57 is out of phase with the PG pulse. However, these lines are covered with the mask of the picture tube so that no serious problem will arise in practice. Moreover, such out-of-phase relationship during a short time interval as described above is preferable in practice, because the malfunction of an automatic phase control in the color signal processing circuit immediately after the switching of the head can be prevented.

The mode of operation of the servo system is substantially similar to that in the conventional video tape recorders. In the reproduction mode, a pulse shaping circuit 71 is energized so as to receive the control pulse derived from the control head 73 and form it into a rectangular waveform at 30 Hz.

So far, in order to synchronize the outputs from the flip-flop 57 in the camera and the flip-flop 70 in the recorder, the flip-flop 70 has been described as being reset in response to the result of the detection whether there exists burst in the modulated color signal passed through the comb filter 63, but it is to be understood that this method can be modified to some extent as will be described below. The polarities of the output from the flip-flop 57 in the camera are determined depending upon the even- and odd-number fields of the video signal, and in response to the output from the sync separator 67, the even and odd fields are detected as is well known in the art so that in response to the detection signal the outputs from both the flip-flops 57 and 70 are synchronized in polarity.

So far the present invention has been described in conjunction with the PS color processing system of the VHS system, but it is to be understood that the present invention may be equally applied to the PI color processing system of the beta-format system. More specifically, in the PI color processing system, the modulated color signal per se is recorded on the A track, but when recorded on the B tracks, the modulated color signal is reversed in polarity for every one HT. In the reproduction mode, the modulated color signal on the B tracks is reproduced and recovered in the original form. Thereafter, the cross talk components between the adjacent tracks are eliminated with the comb filter. Since the PG pulse is used in order to distinguish between the A and B tracks, the present invention can be obviously and equally applied to the PI color processing system.

In general, the present invention can be equally applied to any system in which the signal spectra are interleaved between the adjacent tracks in recording so as to eliminate cross talk. Same is true for the luminance signal.

So far the present invention has been described in conjunction with the NTSC system, but it is to be understood that the present invention can be equally applied to the PAL system. In the PAL system, the modulated color signal is offset by a quarter line so that two HTs must be considered as a time unit. As a result, there must be provided a comb filter with a time-delay circuit capable of delaying for two HT.

Figure 12:
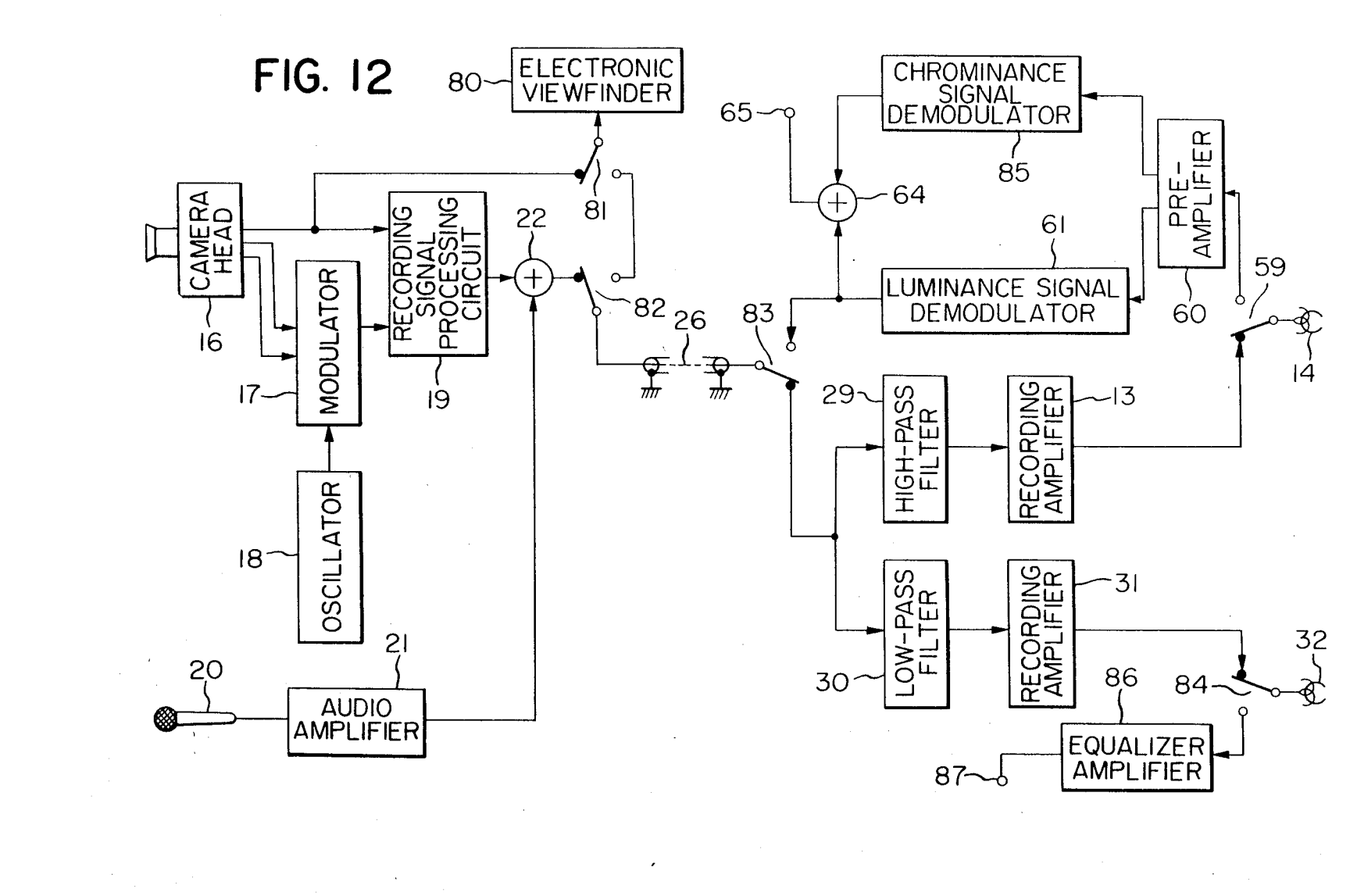
FIG. 12 is a block diagram of a sixth embodiment of the present invention which enables the transmission of the video signal reproduced in the video tape recorder to an electronic viewfinder of the television camera for review.

Sixth Embodiment, FIG. 12

The sixth embodiment to be described with reference to FIG. 12 is capable of returning the reproduced video signal from the video tape recorder to the television camera on the same line on which are transmitted the video, audio and control signals from the camera to the recorder. In general, the television cameras use the electronic viewfinders more than the optical viewfinders because one can immediately monitor or review the recorded scenes reproduced on the electronic viewfinder. To this end, the reproduced video signal must be transmitted to the camera from the video tape recorder. According to the present invention, the reproduced video signal can be transmitted on the same single line as described above.

In FIG. 12, switches 81, 82, 83, 59 and 84 are simultaneously switched when the video tape recorder is switched between the recording and reproduction modes. In the recording mode, these switches close the black dot contacts. As a result, the recording section of the sixth embodiment is substantially similar both in construction and operation to that of the first embodiment shown in FIG. 4. An electronic viewfinder 80 is fed the luminance signal from the camera head 16 so that one can monitor what he or she is recording.

In the reproduction mode, the switches 81, 82, 83, 59 and 84 are switched to close the white dot contacts. As a result, the output from the video head 14 is fed through the switch 59 to the pre-amplifier 60. The luminance signal is reproduced with the luminance signal demodulator 61 while the chrominance signal is reproduced by the chrominance signal demodulator 85. The reproduced signals are mixed in the mixer 64 and the reproduced video signal is derived from the video signal output terminal 65.

The output from the luminance signal demodulator 61 is transmitted through the switch 83 on the single signal line 26 to the television camera. In the television camera, the output is transmitted through the switches 82 and 81 to the electronic viewfinder 80, whereby one can review the reproduced images.

According to the sixth embodiment, it is not needed at all to provide an additional signal line in order to transmit the reproduced luminance signal from the recorder to the camera.

In FIG. 12, reference numeral 86 denotes an equalizer amplifier for audio reproduction, and 87, an audio output terminal.

In summary, according to the present invention, the video signal which is processed in the conventional video tape recorder is processed in the television camera so that the video, audio and control signals can be combined or multiplexed and transmitted on a single signal line from the camera to the video tape recorder without use of any special circuitry. Thus, both the television camera and the video tape recorder can be made simple in construction, compact in size and light in weight.

Furthermore, only one single signal line is used to interconnect between the color television camera and a video tape recorder of the system in which the camera signal is separated into the luminance signal and the color signals; the luminance signal is frequency modulated while the color signals are converted into lower frequency modulated color signal so that they are multiplexed with the FM luminance signal; the multiplexed signal is recorded on the discontinuous and juxtaposed tracks by the helical scanning system or the like; and in order to eliminate cross-talk between the adjacent tracks, the phase of the color signal is shifted for every track in such a way that the color signals recorded on the adjacent tracks may be interleaved. Furthermore, the phase shift of the color signal can be timed exactly with the rotary phase of the rotary head.

Opposed to the conventional camera chains, the use of multicore conductors can be eliminated so that very satisfactory operability can be ensured. In addition, the camera chains become inexpensive.

What is claimed is:

1. A system for coupling between an image pickup device and a recording device of the type in which rotary head means sequentially records on adjacent tracks at least an angularly modulated luminance signal and a modulated color signal in a frequency range lower than the lowermost sideband of said angularly modulated luminanace signal, said system comprising:
   (A) an image pickup device comprising:
      (a) first means for converting a received image into a luminance signal and first and second color signals,
      (b) second means for effecting angular modulation of said luminance signal derived from said first means,
      (c) third means for converting said first and second color signals derived from said first means into a frequency range lower than the lowermost sideband of the angularly modulated luminance signal derived from said second means,
      (d) fourth means for controlling the phase of the carriers of said converted first and second color signals in such a way that said converted first and second color signals derived from said third means are interleaved with each other on adjacent tracks upon which said converted first and second color signals are sequentially recorded,
      (e) fifth means for deriving an audio signal by means of a microphone attached to said image pickup device, said audio signal being of the base band in a frequency range lower than the frequency range of said converted first and second color signals derived from said third means, and
      (f) sixth means for multiplexing at least said angularly modulated luminance signal derived from said second means, said phase-controlled converted first and second color signals derived from said fourth means and said audio signal derived from said fifth means,
   (B) a single cable to transmit said multiplexed signal derived from said sixth means to said recording device, and
   (C) a recording device comprising:
      (a) seventh means for deriving said angularly modulated luminance signal and said phase-controlled converted first and second color signals from said multiplexed signal transmitted through said single signal cable from said image pickup device, (b) eighth means for recording by means of said rotary head means said angularly modulated luminance signal and said phase-controlled, converted first and second color signals derived from said seventh means in the spectrum as derived, (c) ninth means for deriving said audio signal from said multiplexed signal transmitted through said single signal cable from said image pickup device, (d) tenth means for recording said audio signal derived from said ninth means through audio recording circuit means, and (e) eleventh means responsive to a signal indicative of the rotational position of said rotary head means for controlling said fourth means such that the phase of the color carriers of said converted first and second color signals are shifted by a predetermined amount for each horizontal scanning time interval, said eleventh means including means which controls the passage of harmonics of said angularly modulated luminance signal through said single signal cable in response to the phase of said rotating-phase pulse of said rotary head, and said fourth means includes means which derives the rotating-phase pulse of said rotary head means by detecting the passage of said harmonics of said angularly modulated luminance signal through said single signal cable.

2. An interconnection system between an image pickup device and a recording device of the type in which rotary head means sequentially records on adjacent tracks at least an angularly modulated luminance signal and a converted color signal in a frequency range lower than the lowermost sideband of said angularly modulated liminance signal, wherein:

(A) said image pickup device includes:

(a) first means for converting a received image into a luminance signal and two color signals, (b) second means for converting the luminance signal obtained by said first means into the angularly modulated luminance signal, (c) third means for converting the two color signals obtained by said first means to a frequency range lower than the lowermost sideband of the angularly modulated luminance signal obtained by said second means, (d) fourth means for detecting the presence/absence state of upper harmonics of the angularly modulated luminance signal obtained by said second means and for producing a presence/absence state signal in response thereto, and (e) fifth means for controlling the phase of the carriers of the converted color signals for each vertical period in accordance with said presence/absence state signal of the upper harmonics of the angularly modulated luminance signal obtained by said fourth means such that the spectra of the converted color signals obtained by said third means are interleaved with each other on adjacent tracks when the converted color signals are sequentially recorded by said recording device;

(B) a single cable is provided for supplying a composite signal of the modulated luminance signal obtained by said image pickup device and the converted color signals, to said recording device; and (C) said recording device includes:

(a) sixth means for recording by said rotary head means said angularly modulated luminance signal and said converted color signals without changing the spectra thereof, and (b) seventh means for controlling a filtering/nonfiltering state of the upper harmonics of the angularly modulated luminance signal on said signal cable in accordance with the rotary phase of said rotary head.

* * * * *